(12) United States Patent
Won et al.

(10) Patent No.: US 8,026,995 B2
(45) Date of Patent: Sep. 27, 2011

(54) LIQUID CRYSTAL DISPLAY AND METHOD OF FABRICATING THE SAME

(75) Inventors: Yong-Gwang Won, Cheonan-si (KR); Jun-Hee Son, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 269 days.

(21) Appl. No.: 12/406,177

(22) Filed: Mar. 18, 2009

(65) Prior Publication Data
US 2009/0237587 A1  Sep. 24, 2009

(30) Foreign Application Priority Data

Mar. 19, 2008 (KR) .................. 10-2008-0255258
Aug. 12, 2008 (KR) .................. 10-2008-0079018

(51) Int. Cl.
G02F 1/1333 (2006.01)
G02F 1/1335 (2006.01)
(52) U.S. Cl. .................. 349/58; 349/61; 349/65
(58) Field of Classification Search .................. None
See application file for complete search history.

(56) References Cited

U.S. PATENT DOCUMENTS

| 5,438,484 | A  | * | 8/1995  | Kanda et al. ......... 362/613 |
| 7,192,174 | B2 | * | 3/2007  | Myoung ............... 362/561 |
| 7,375,775 | B2 | * | 5/2008  | Kim ................... 349/58  |
| 2004/0062030 | A1 |   | 4/2004  | Yamada et al. |
| 2005/0099790 | A1 | * | 5/2005  | Kang et al. ......... 362/31 |
| 2005/0213311 | A1 | * | 9/2005  | Lee .................. 362/29 |
| 2006/0028839 | A1 |   | 2/2006  | Kang et al. |
| 2006/0203144 | A1 |   | 9/2006  | Kim et al. |
| 2007/0085943 | A1 |   | 4/2007  | Kang et al. |
| 2007/0153155 | A1 |   | 7/2007  | Chung et al. |
| 2007/0230217 | A1 |   | 10/2007 | Sakaki et al. |
| 2008/0088764 | A1 | * | 4/2008  | Son et al. ......... 349/58 |

FOREIGN PATENT DOCUMENTS

| JP | 2006351387    | 12/2006 |
| KR | 1020050028439 | 3/2005  |
| KR | 1020070004335 | 1/2007  |

OTHER PUBLICATIONS

European Extended Search Report for EP Application No. 09003735.9-2216 dated Jul. 16, 2009.

* cited by examiner

*Primary Examiner* — Tina Wong
(74) *Attorney, Agent, or Firm* — Cantor Colburn LLP (57) ABSTRACT

A liquid crystal display ("LCD") includes a light guide panel ("LGP") guiding light, first and second light sources that are disposed at either side of the LGP and emit the light, a lower receiving container having a bottom surface which is disposed below the LGP and the first and second light sources, an enclosing portion that extends from a first end of the bottom surface and that is folded to enclose the first light source, and an opening portion that extends from a second end of the bottom surface and that is opened toward an upper direction, and a first reflection sheet covering the opening portion of the lower receiving container above the second light source.

19 Claims, 8 Drawing Sheets

PRIOR ART

LIQUID CRYSTAL DISPLAY AND METHOD OF FABRICATING THE SAME

This application claims priority to Korean Patent Application Nos. 10-2008-0025528 and 10-2008-0079018 filed on Mar. 19, 2008 and Aug. 12, 2008, respectively, and all the benefits accruing therefrom under 35 U.S.C. §119, and the contents of which in their entireties are herein incorporated by reference.

BACKGROUND OF THE INVENTION

1. Field of the Invention

The present invention relates to a liquid crystal display ("LCD") and method of fabricating the same, and more particularly, to an LCD and method of fabricating the same that can provide lower fabrication costs, a reduced assembly time, and improved display quality.

2. Description of the Related Art

A liquid crystal display ("LCD") includes a liquid crystal panel and a backlight assembly.

The liquid crystal panel includes a first substrate having a field-generating electrode such as a pixel electrode or a common electrode, a second substrate, and a liquid crystal layer disposed between the first and second substrate and having liquid crystal molecules. Voltages are applied to the field-generating electrodes to generate an electric field in the liquid crystal layer having liquid crystal molecules, which determines the orientations of the liquid crystal molecules to control polarization of incident light, thereby displaying an image. The liquid crystal panel of an LCD does not emit light by itself, so that the LCD requires the use of a separate backlight assembly as a light source to supply light to the liquid crystal panel.

The backlight assembly supplies light to the liquid crystal panel, since the liquid crystal panel includes elements incapable of emitting light. In general, the backlight assembly includes a light source supplying light to the liquid crystal panel, a light source cover that covers the light source to protect the light source, a light guide plate guiding the light emitted from the light source to the liquid crystal panel, one or more optical sheets provided for improving optical properties of the light guided to the liquid crystal panel, and a reflective sheet disposed below the light guide plate.

BRIEF SUMMARY OF THE INVENTION

The present invention provides a liquid crystal display ("LCD") that can provide low fabrication costs, a reduced assembly time, and improved display quality.

The present invention also provides a method of fabricating the LCD, capable of reducing the fabrication costs and an assembly time while providing improved display quality.

According to exemplary embodiments of the present invention, there is provided an LCD including a light guide panel ("LGP") guiding light, first and second light sources that are disposed at either side of the LGP and emit the light, a lower receiving container having a bottom surface which is disposed below the LGP and the first and second light sources, an enclosing portion that extends from a first end of the bottom surface and that is folded to enclose the first light source, and an opening portion that extends from a second end of the bottom surface and that is opened toward an upper direction, and a first reflection sheet covering the opening portion of the lower receiving container above the second light source.

According to other exemplary embodiments of the present invention, there is provided an LCD including an LGP guiding light, first and second light sources that are disposed at either side of the LGP and emit the light, a lower receiving container having a bottom surface disposed below the LGP and the first and second light sources, a first opening portion that extends from a first end of the bottom surface and that is opened toward a first upper direction, and a second opening portion that extends from a second end of the bottom surface and that is opened toward a second upper direction, a first reflection sheet covering the first opening portion of the lower receiving container above the first light source, and a second reflection sheet covering the second opening portion of the lower receiving container above the second light source.

According to still other exemplary embodiments of the present invention, there is provided a method of fabricating an LCD, the method including preparing a lower receiving container having a bottom surface and a folded portion that extends from a first end of the bottom surface, and the lower receiving container having an opening portion that extends from a second end of the bottom surface and that is opened toward an upper direction, mounting a first reflection sheet on the bottom surface and the second end of the bottom surface, installing a first light source into the folded portion of the lower receiving container so as to enclose the first light source, mounting an LGP on the bottom surface, and installing a second light source above the second end of the bottom surface, and folding the first reflection sheet so as to enclose the second light source.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the singular forms "a", "an" and "the" are intended to include the plural forms as well, unless the context clearly indicates otherwise.

It will be further understood that the terms "comprises" and/or "comprising" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, the present invention will be explained in more detail with reference to the accompanying drawings.

Figure 1:
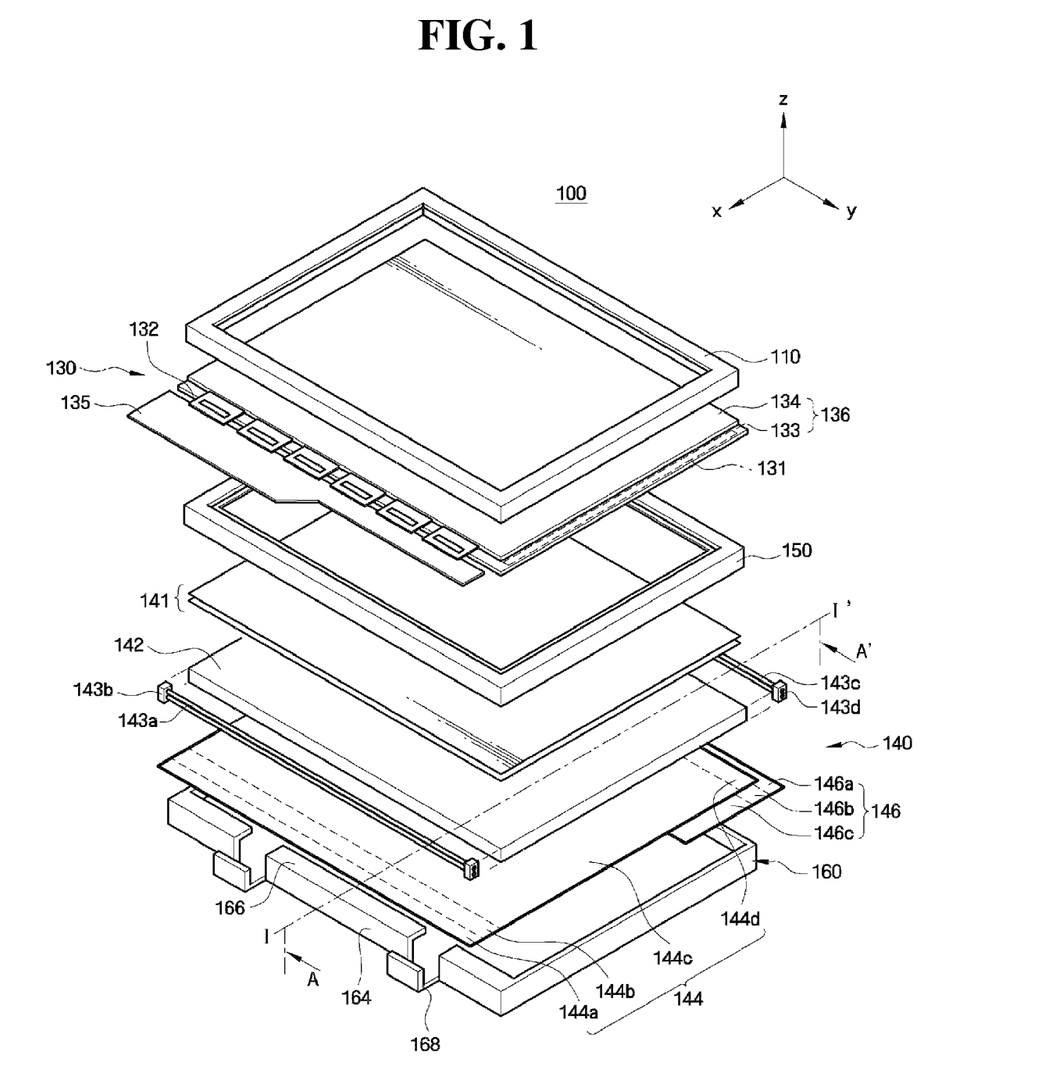
FIG. 1 is an exploded perspective view of an exemplary liquid crystal display ("LCD") according to an exemplary embodiment of the present invention.
Figure 2:
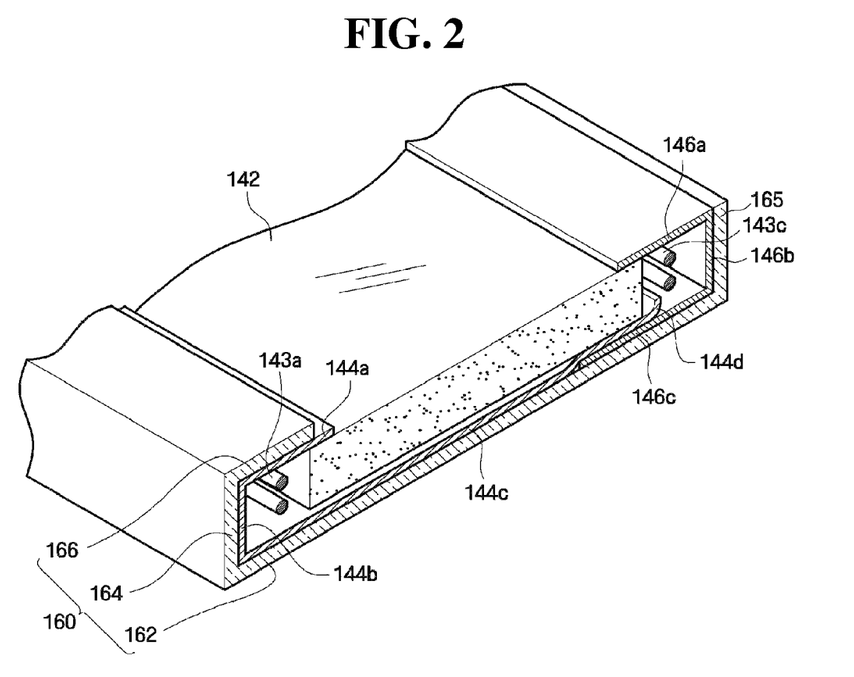
FIG. 2 is a perspective view of the exemplary LCD of FIG. 1 cut along line I-I' as viewed from direction AA'.
Figure 3:
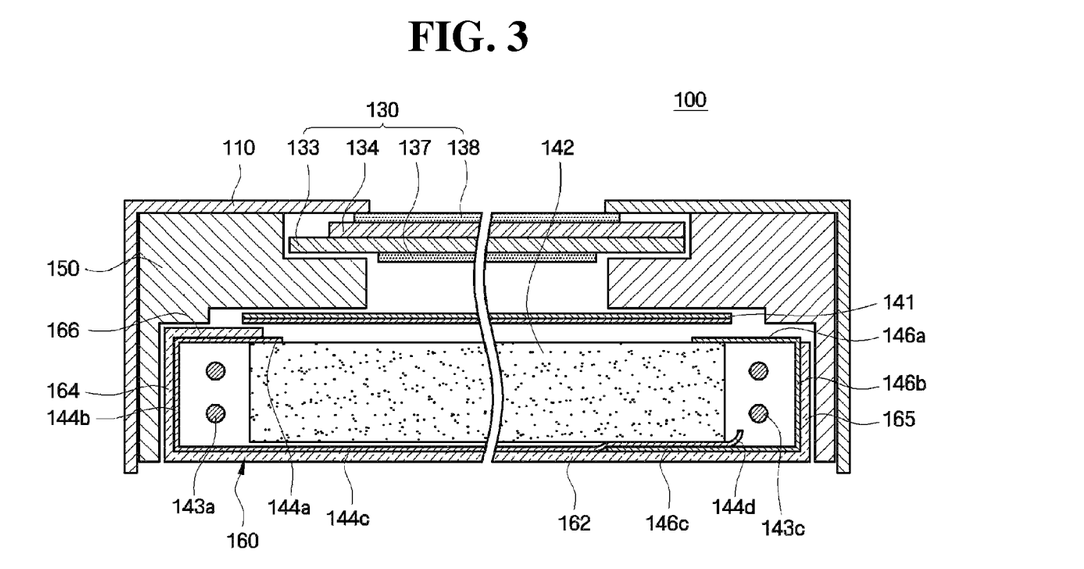
FIG. 3 is an assembled cross-sectional view of the exemplary LCD of FIG. 1 cut along line I-I'.
Figure 4A:
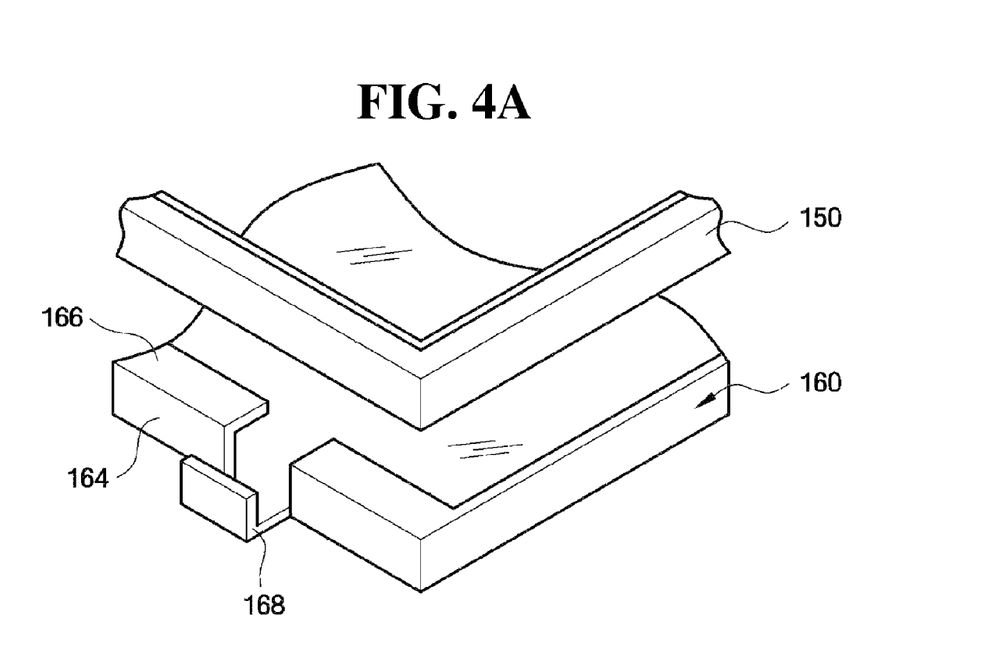
FIGS. 4A and 4B illustrate an exemplary connection relationship between a middle frame and a lower receiving container in the exemplary LCD of FIG. 1.
Figure 4B:
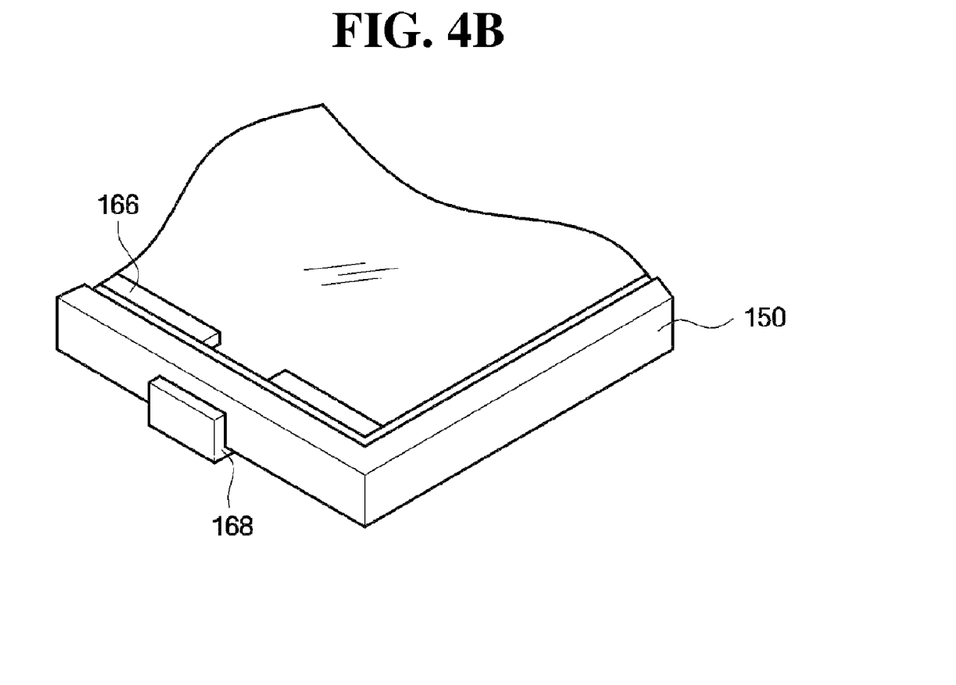

FIG. 1 is an exploded perspective view of an exemplary liquid crystal display ("LCD") according to an exemplary embodiment of the present invention, FIG. 2 is a perspective view of the exemplary LCD of FIG. 1 cut along line I-I' as viewed from the direction AA', FIG. 3 is an assembled cross-sectional view of the exemplary LCD of FIG. 1 cut along line I-I', and FIGS. 4A and 4B illustrate a connection relationship between a middle frame and a lower receiving container in the exemplary LCD of FIG. 1.

In FIG. 2, first and second reflection sheets 144 and 146, first and second light sources 143a and 143c, and a light guide panel ("LGP") 142 are combined with a lower receiving container 160.

Referring to FIGS. 1 through 4B, the LCD 100 according to the current embodiment largely includes a liquid crystal panel assembly 130, a backlight assembly 140, and receiving containers 110, 150, and 160. The receiving containers 110, 150, and 160 are hereinafter referred to as a lower receiving container 160, a middle frame 150, and an upper receiving container 110.

The liquid crystal panel assembly 130 includes a liquid crystal panel 136 having a first substrate 133, a second substrate 134 opposing the first substrate 133, and a liquid crystal molecular layer (not shown) sandwiched between the first and second substrates 133 and 134, a first polarizing plate (137 in FIG. 3) disposed beneath the liquid crystal panel 136, a second polarizing plate (138 in FIG. 3) disposed on the liquid crystal panel 136, a gate driving integrated circuit ("IC") 131, a data chip film package 132, and a printed circuit board ("PCB") 135.

The first substrate 133 may include a plurality of gate lines (not shown), a plurality of data lines (not shown), a thin film transistor ("TFT") array, and a pixel electrode. The second substrate 134 includes a color filter, a black matrix, and a common electrode. In another exemplary embodiment, the color filter and/or the common electrode may be disposed on the first substrate 133.

The first polarizing plate 137 polarizes light which is incident on the liquid crystal panel 136. The second polarizing plate 138 polarizes light exiting the liquid crystal panel 136. The liquid crystal panel 136 receives light from outside, from an exterior of the liquid crystal panel 136, and controls the amount of light transmitting the liquid crystal molecular layer in order to display a desired image.

The gate driving IC 131 is disposed on the first substrate 133 and connected to the plurality of gate lines formed on the first substrate 133. The data chip film package 132 may be connected to the plurality of data lines formed on the first substrate 133. An example of the data chip film package 132 used in the present invention includes a tape automated bonding ("TAB") tape which includes wiring patterns formed, or otherwise disposed, on a base film and a semiconductor chip bonded to the wiring patterns by a TAB technique. Examples of the chip film package of the present invention include, but are not limited to, a tape carrier package ("TCP"), a chip on film ("COF"), and the like.

The PCB 135 may include drive components for respectively inputting a gate driving signal and a data driving signal to the gate driving IC 131 and the data chip film package 132.

The backlight assembly 140 includes a LGP 142 guiding light, a first light source unit 143a and 143b and a second light source unit 143c and 143d emitting light, a first reflection sheet 144 having a portion thereof disposed below the LGP 142 and the remaining portion enclosing the first light source 143a, a second reflection sheet 146 having a portion thereof disposed below the LGP 142 and the remaining portion enclosing the second light source 143c, and at least one optical sheet 141.

The LGP 142 is formed of a transparent material such as, but not limited to, acryl plastic and guides light emitted from the first and second light sources 143a and 143c toward the liquid crystal panel 136 disposed above the LGP 142. The LGP 142 may have various patterns formed or otherwise disposed on the bottom surface thereof so as to change the propagation direction of light incident into the LGP 142 towards the liquid crystal panel 136.

The first light source unit 143a and 143b includes the first light source 143a and first lamp holders 143b. Similarly, the second light source unit 143c and 143d includes the second light source 143c and second lamp holders 143d. The first and second light sources 143a and 143c are disposed at two opposing sides of the LGP 142 so as to provide light. As shown in FIGS. 1 through 3, the first and second light sources 143a and 143c may be line light sources. In an exemplary embodiment, the line light sources may include a line lamp such as a cold cathode fluorescent lamp ("CCFL") or a hot cathode fluorescent lamp ("HCFL").

The first lamp holders 143b are disposed at either end of the first light source 143a and fix the first light source 143a. Likewise, the second lamp holders 143d are disposed at either end of the second light source 143c and fix the second light source 143c. The first and second light sources 143a and 143c may be electrically connected to an inverter (not shown) so as to receive power from the inverter.

The first and second reflection sheets 144 and 146 are disposed below the LGP 142 and within the lower receiving container 160 and reflect light radiating toward a bottom surface of the LGP 142 back towards the LGP 142. More specifically, the first and second reflection sheets 144 and 146 reflects light that is not reflected by a fine dot pattern formed or otherwise disposed on the bottom surface of the LGP 142 back toward a light exiting surface of the LGP 142, thereby reducing loss of light incident upon the liquid crystal panel 136 and increasing the uniformity of light transmitted through the light exit surface of the LGP 142.

The first reflection sheet 144 includes a first portion 144c that is disposed below the LGP 142 and the first light source 143a and a second portion 144a and 144b that extends upward from one end (a first end) of the first portion 144c and is folded to enclose the first light source 143a. In an exemplary embodiment, portion 144b of the second portion may extend from the first end of the first portion 144c and substantially perpendicular to the first portion 144c, and portion 144a of the second portion may extend from an end of portion 144b, substantially perpendicular to portion 144b, and substantially parallel to first portion 144c. The second reflection sheet 146 includes a third portion 146c that is disposed below the LGP 142 and the second light source 143c and a fourth portion 146a and 146b that extends upward from one end (a first end) of the third portion 146c and is folded to enclose the second light source 143c. In an exemplary embodiment, portion 146b of the fourth portion may extend from the first end of the third portion 146c and substantially perpendicular to the third portion 146c, and portion 146a of the third portion may extend from an end of portion 146b, substantially perpendicular to portion 146b, and substantially parallel to third portion 146c.

Thus, the first reflection sheet 144 encloses the first light source 143a and irregularly reflects light emitted by the first light source 143a toward the LGP 142. Likewise, the second reflection sheet 146 encloses the second light source 143c and irregularly reflects light emitted by the second light source 143c toward the LGP 142. In this way, the first and second reflection sheets 144 and 146 can improve the utilization efficiency of light emitted by the first and second light sources 143a and 143c.

The first portion 144c of the first reflection sheet 144 includes a slope portion 144d that is raised from the other end (a second end) of the first portion 144c toward the LGP 142.

The slope portion 144d helps reduce or prevent leakage of light that can occur at the other side (a second side) of the LGP 142 close to the second light source 143c.

More specifically, one side (a first side) of the LGP 142 is fixedly received in a space of the lower receiving container 160 formed by a portion of a bottom surface 162, a first side wall 164, a second side wall 165, and a top surface 166. The first reflection sheet 144 is fixedly inserted between the lower receiving container 160 and the LGP 142. Thus, the bottom surface of the first side of the LGP 142 is held in close contact with the underlying first reflection sheet 144, thereby preventing leakage of light.

Conversely, the second side of the LGP 142 in close proximity to the second light source 143c is not fixedly received in a space formed by a portion of the lower receiving container 160. Thus, a loosening may be created between the bottom surface of the second side of the LGP 142 and the underlying first reflection sheet 144, which causes the leakage of light through the loosened portion. However, the slope portion 144d curved toward the LGP 142 reflects light incident on the top and bottom surfaces of the LGP 142, thus reducing or preventing leakage of light through the loosened portion.

Either or both of the first and second reflection sheets 144 and 146 may be formed of silver (Ag) so as to easily reflect light. The first and second reflection sheets 144 and 146 are also disposed between the backlight assembly 140 and the liquid crystal panel 136, or driving portions of the liquid crystal panel 136, so as to reduce crosstalk and interference between electrical signals for driving the backlight assembly 140 and for driving the liquid crystal panel 136. That is, the first and second reflection sheets 144 and 146 can block out waterfall noise.

Either or both of the first and second reflection sheets 144 and 146 may have a thickness of about 220 μm or greater because the first and second reflection sheets 144 and 146 must be sufficiently thick so as to alleviate or prevent a sheet wrinkle or brightness decrease.

The at least one optical sheet 141 is disposed above the LGP 142, so as to be between the LGP 142 and the liquid crystal panel 136, and diffuses and condenses light passing through the LGP 142. The at least one optical sheet 141 may include a diffusion sheet, a prism sheet, and a protection sheet. The diffusion sheet is disposed between the LGP 142 and the prism sheet and diffuses light incident through the LGP 142 so as to prevent partial concentration of light. The prism sheet has a plurality of triangular prisms aligned on a top surface thereof and condenses light diffused by the diffusion sheet in a direction perpendicular to the liquid crystal panel 136. The protection sheet is disposed on the prism sheet so as to protect a surface of the prism sheet and scatters incident light so as to make distribution of light uniform. While a particular arrangement of sheets within optical sheet 141 has been described, alternative arrangements including varying sheets would also be within the scope of these embodiments.

The lower receiving container 160 is adapted to sequentially receive therein the first reflection sheet 144, the second reflection sheet 146, the first light source 143a, the second light source 143c, the LGP 142, and the at least one optical sheet 141. Alternatively, the lower receiving container 160 may be adapted to sequentially receive therein the second reflection sheet 146, the first reflection sheet 144, the first light source 143a, the second light source 143c, the LGP 142, and the at least one optical sheet 141. The lower receiving container 160 may be formed of metal that can provide a high strength against an external shock and electrical ground capability.

The lower receiving container 160 may include the bottom surface 162, the first side wall 164 and the top surface 166 folded to enclose the first light source 143a, and the second side wall 165 extended from the other end of the bottom surface 162. The lower receiving container 160 may also include third and fourth opposing side walls that connect the first side wall 164 to the second side wall 165. The first side wall 164 may be formed substantially perpendicular to the bottom surface 162, and the top surface 166 may be formed substantially perpendicular to the first side wall 164 and substantially parallel to the bottom surface 162.

The bottom surface 162 is disposed beneath the first portion 144c of the first reflection sheet 144 and beneath the third portion 146c of the second reflection sheet 146. The first side wall 164 extends upward from one end of the bottom surface 162 and the top surface 166 extends from the first side wall 164 parallel to the bottom surface 162.

The portion of the lower receiving container 160 where the first light source 143a is disposed can be folded in a Korean alphabet "ㄷ" shape, such as three sides of a rectangular shape, and the portion where the second light source 143b is disposed can be folded in an "L" shape. Specifically, the first light source 143a may be disposed in the "ㄷ"-shaped space formed by one end of the bottom surface 162 of the lower receiving container 160, the first side wall 164 and the top surface 166, and the second light source 143b may be disposed in the "L"-shaped space formed by the other side of the bottom surface 162 of the lower receiving container 160 and the second side wall 165.

The lower receiving container 160 further includes hooks 168 that extend from two opposing ends of the bottom surface 162 and is further folded in an "L" shape as shown in FIG. 1. Each of the hooks 168 may be formed by making an incision in a portion of the first side wall 164, bending outward the portion of the first side wall 164, and refolding the same portion parallel to the first side wall 164. As shown in FIGS. 4A and 4B, the middle frame 150 is fixedly received in a space defined by the hooks 168. In an alternative exemplary embodiment, the hooks 168 may also extend from the second side wall 165.

The middle frame 150 may have a rectangular frame shape with four side walls. Referring to FIGS. 4A and 4B, the middle frame 150 slides down so as to cover and enclose the first side wall 164 and the second side wall 165 of the lower receiving container 160, thereby increasing coupling between the middle frame 150 and the lower receiving container 160.

The middle frame 150 encloses the second portion 144a and 144b of the first reflection sheet 144 and the fourth portion 146a and 146b of the second reflection sheet 146 and has an indented top surface, formed along an inner portion of the top surface of the middle frame 150, for receiving the liquid crystal panel 136. For example, the middle frame 150 may be a plastic mold frame that is configured to protect components fixed thereinto against breakage.

The upper receiving container 110 is combined with the middle frame 150 so as to fix the liquid crystal panel 136 to the indented top surface of the middle frame 150. The upper receiving container 110 has a window frame shape including rectangular prisms and has a central open space through which an image displayed on the liquid crystal panel 136 can be seen.

Figure 5:
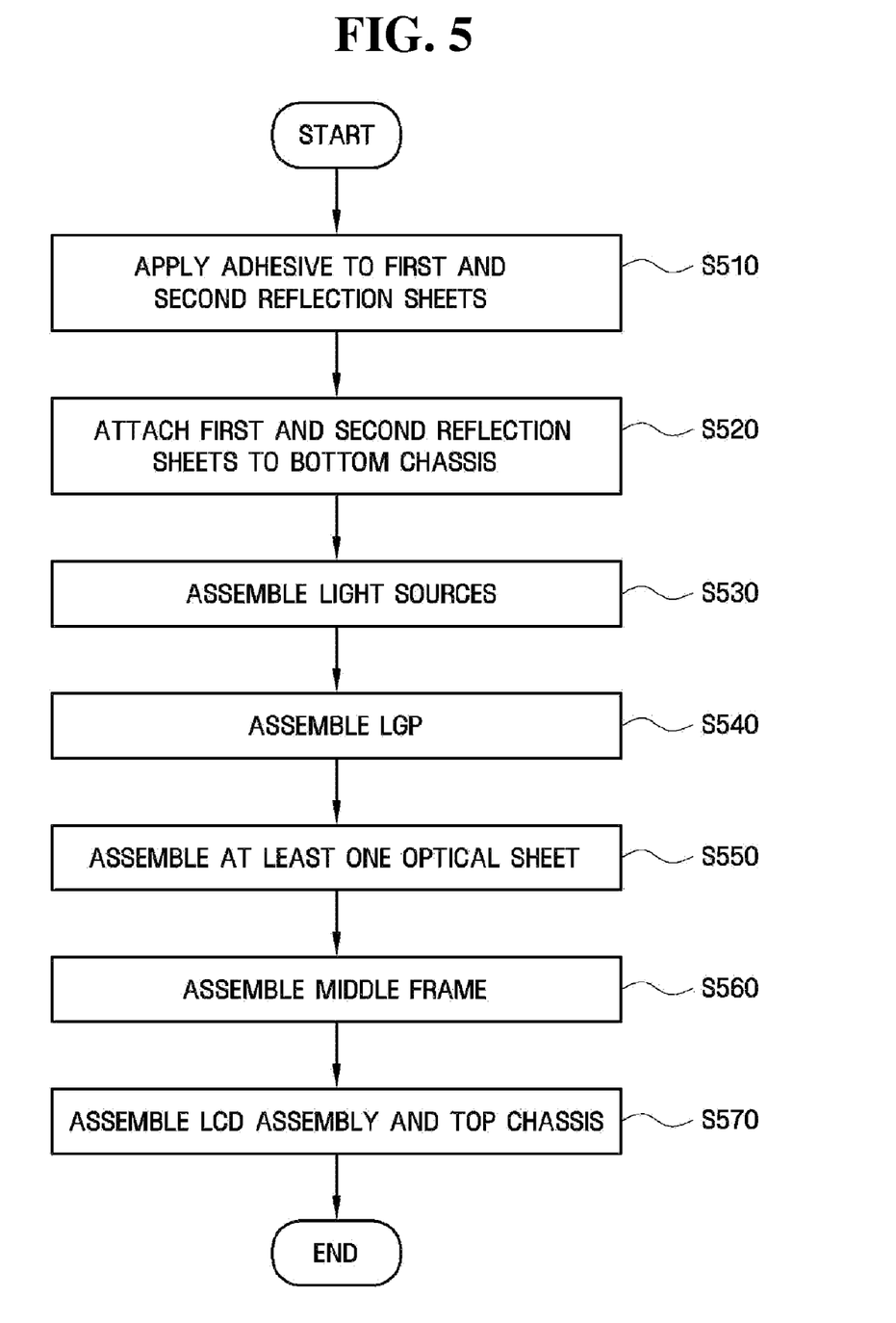
FIG. 5 is a flowchart illustrating an exemplary method of assembling the exemplary LCD of FIG. 1.
Figure 6:
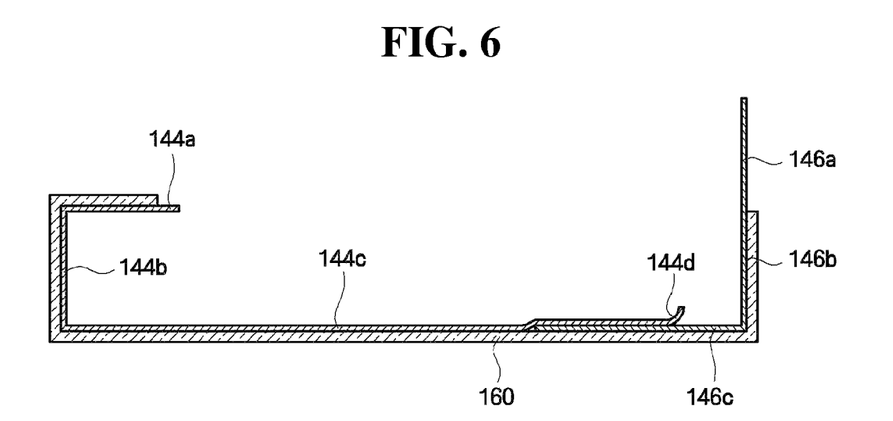
FIG. 6 is a cross-sectional view illustrating a state of the exemplary LCD of FIG. 1 in which the first and second reflection sheets are attached to the lower receiving container according to the exemplary method of FIG. 5.
Figure 7:
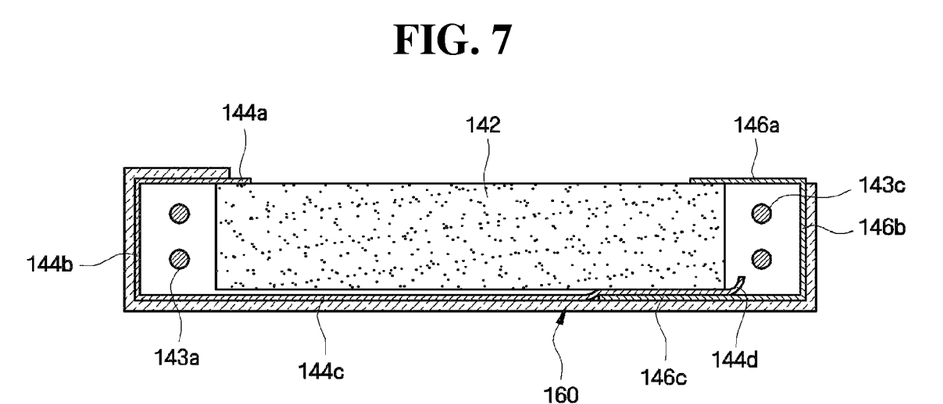
FIG. 7 is a cross-section view illustrating a state of the exemplary LCD of FIG. 1 in which the LGP is assembled to the resulting structure according to the exemplary method of FIG. 5.

FIG. 5 is a flowchart illustrating an exemplary method of assembling the exemplary LCD 100 of FIG. 1. FIG. 6 is a cross-sectional view illustrating a state of the exemplary LCD of FIG. 1 in which the first and second reflection sheets are attached to the lower receiving container according to the exemplary method of FIG. 5. FIG. 7 is a cross-sectional view illustrating a state of the exemplary LCD of FIG. 1 in which the LGP is assembled to the resulting structure according to the exemplary method of FIG. 5.

Referring to FIGS. 1 and 5, an adhesive member is applied to portions of the first and second reflection sheets 144 and 146 that will be attached to the lower receiving container 160 (S510). For example, the adhesive member may be a double-sided tape.

Subsequently, the first and second reflection sheets 144 and 146 are attached to the lower receiving container 160 using the applied adhesive member (S520). Referring to FIG. 6, the first and second reflection sheets 144 and 146 are attached to the lower receiving container 160 so that the other end, the second end, of the first portion 144c of the first reflection sheet 144 partially overlaps the other end, the second end, of the third portion 146c of the second reflection sheet 146 on the bottom surface 162 of the lower receiving container 160. FIG. 6 shows a state in which the second portion 144a and 146b of the first reflection sheet 144 is folded into an upside-down 'L' shape while the fourth portion 146a and 146b of the second reflection sheet 146 has not yet been folded. To easily fold the second portion 144a and 144b of the first reflective sheet 144, the folded portions of the second portion 144a and 144b may be provided with a folding crease by making an incision in each folded portion, as shown by dashed lines in FIG. 1. The portion 144b of the second portion of the first reflection sheet 144 abuts and may be adhered to an interior surface of the first side wall 164 of the lower receiving container 160 and the portion 144a of the second portion of the first reflection sheet 144 abuts and may be adhered to an interior surface of the top surface 166 of the lower receiving container 160. Likewise, the second portion 146b of the second reflection sheet 146 may abut and may be adhered to an interior surface of the second side wall 165 of the lower receiving container 160.

The first light source unit 143a and 143b and the second light source unit 143c and 143d are then assembled to the resulting structure in which the first and second reflection sheets 144 and 146 have been attached to the lower receiving container 160 (S530). Alternatively, the second light source unit 143c and 143d may be assembled after assembling the LGP 142 which will be described later.

Thereafter, the LGP 142 is assembled to the resulting structure (S540). Referring to FIG. 7, as described above, one side of the LGP 142 is fixedly received in a space formed by a portion of the bottom surface 162, the first side wall 164, and the top surface 166. After assembling the LGP 142 in this way, the fourth portion 146a and 146b of the second reflective sheet 146 is folded into an upside-down 'L' shape. FIG. 2 is a cross-sectional perspective view illustrating a state of the LCD 100 in which the fourth portion 146a and 146b of the second reflective sheet 146 has been folded into an upside-down 'L' shape. The portion 144a of the second portion of the first reflective sheet 144 and the portion 146a of the fourth portion of the second reflective sheet 146 may slightly overlap opposing side edges of the LGP 142.

To easily fold the fourth portion 146a and 146b of the second reflective sheet 146, the folded portions of the fourth portion 146a and 146b may be provided with a folding crease by making an incision in each folded portion, as shown by dashed lines in FIG. 1.

The at least one optical sheet 141 is then assembled on the LGP 142 (S550). The optical sheet 141 may be received in an interior upper surface of the middle frame 150.

The middle frame 150 is assembled onto the at least one optical sheet 141 (S560). As described above, the middle frame 150 may be combined with the lower receiving container 160.

The liquid crystal panel assembly 130 and the upper receiving container 110 are sequentially assembled with the resulting structure (S570).

The LCD 100 having the above-mentioned configuration and the method of assembling the LCD according to the current exemplary embodiment can reduce both fabrication costs and time.

The LCD 100 does not require a separate lamp cover. Further, the integrated lower receiving container 160 eliminates the need for an adhesive member such as an aluminum tape for attaching parts of a separate-type lower receiving container together, thus reducing the fabrication costs. The method of assembling the LCD 100 allows sequential, bottom-up assembling, thereby reducing a time required to fabricate and assemble the LCD 100 while enabling high volume automatic assembling operations.

Figure 8A:
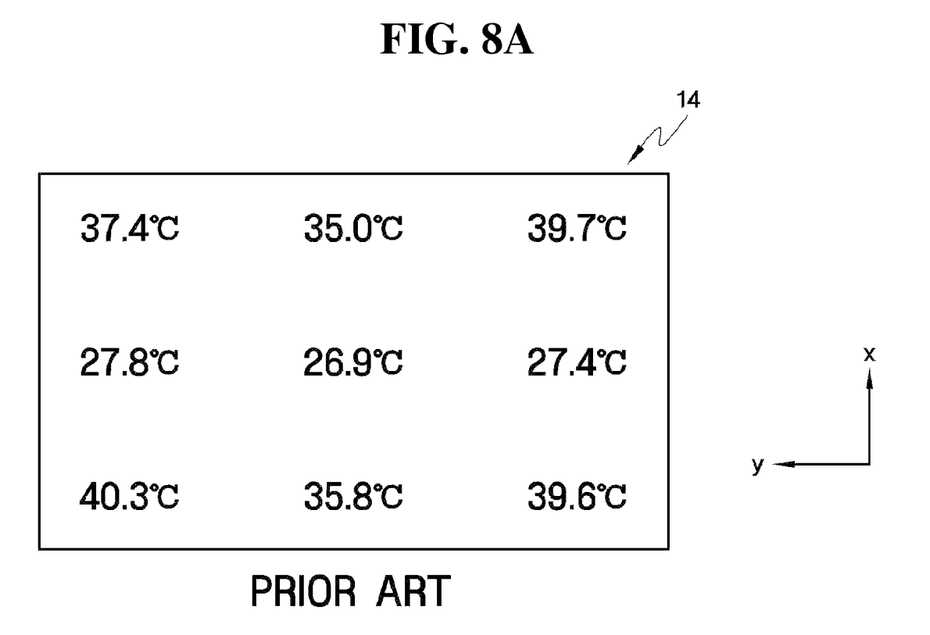
FIG. 8A is a plan view illustrating temperature distribution on a backlight assembly in a conventional LCD.
Figure 8B:
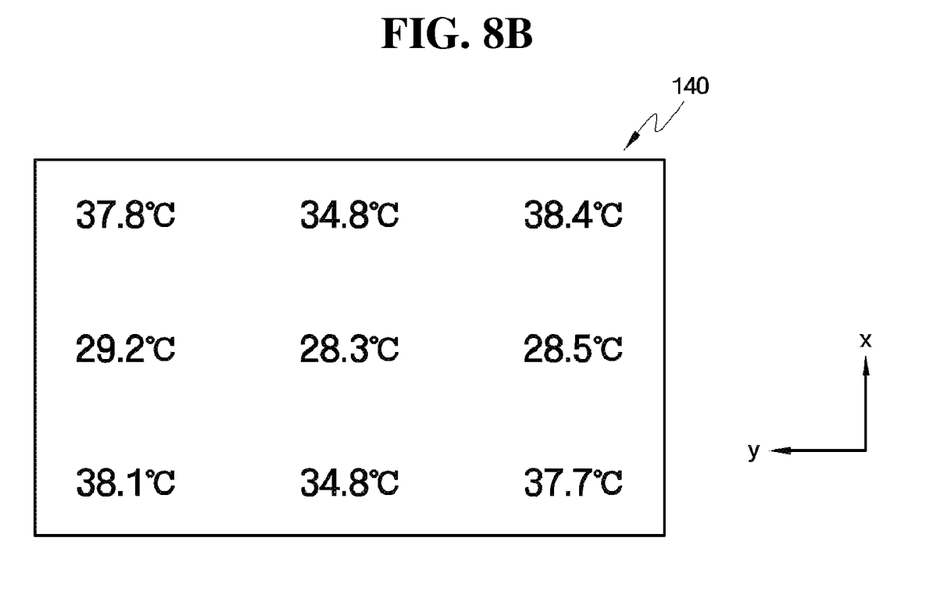
FIG. 8B is a plan view illustrating temperature distribution on a backlight assembly in the exemplary LCD of FIG. 1.

FIG. 8A is a plan view illustrating temperature distribution on a backlight assembly 14 in a conventional LCD, and FIG. 8B is a plan view illustrating temperature distribution on a backlight assembly 140 in the exemplary LCD (100 of FIG. 1), through which light is emitted toward the liquid crystal panel 136.

While only the first side of the LGP 142 in the LCD 100 is inserted in a space formed by a portion of the bottom surface 162, the first side wall 164, and the top surface 166 of the lower receiving container 160, both sides of an LGP 14 in the conventional LCD are received in spaces formed by portions of a bottom surface, a side wall, and a top surface of a lower receiving container.

In the LCD 100 of FIG. 1, all of the electrical energy put into first and second light sources 143a and 143c are not converted into light. That is, some of the electrical energy may be converted to heat and be lost forever. The heat generated in this way may be transferred to the liquid crystal panel 136, thereby degrading the display quality of the liquid crystal panel 136.

More specifically, because the first and second light sources 143a and 143c are disposed at the periphery of the backlight assembly 140, temperature at the periphery is higher than at the center as illustrated in FIG. 8B. Similarly, temperature at the periphery of the liquid crystal panel 136 to which heat is transferred from the backlight assembly 140 is higher than at the center.

Due to a difference in temperature of the liquid crystal panel 136, it is difficult to control the alignment of liquid crystal molecules within the liquid crystal panel 136. Liquid crystal molecules cannot be aligned in a predetermined direction at the periphery of the liquid crystal panel 136, causing leakage of light. A greater difference between temperatures at the center and at the periphery of the liquid crystal panel 136 makes it more difficult to align the liquid crystal molecules in a predetermined direction.

Referring to FIGS. 8A and 8B, a temperature at the periphery of the backlight assembly 14 or 140 is higher than at the center of the backlight assembly 14 or 140.

However, because the LCD 100 according to the present invention does not include the top surface 166 of the lower receiving container 160 between the second reflection sheet 146 and the middle frame 150, heat generated in the second light source 143c is not blocked by the top surface 166 of the lower receiving container 160 but dissipated out. In other words, the second light source 143c is not enclosed by the lower receiving container 160. Such heat dissipation may reduce a difference between temperatures at the center and at the periphery of the backlight assembly 140.

Figure 9:
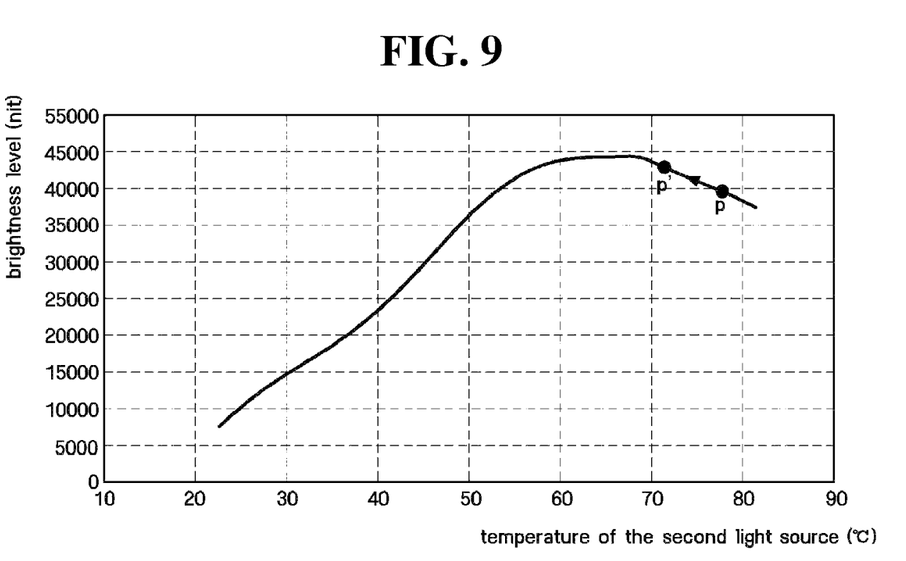
FIG. 9 is a graph illustrating a relationship between surface temperature and brightness of the exemplary second light source shown in FIG. 1.

FIG. 9 is a graph illustrating a relationship between surface temperature and brightness of the second light source shown in FIG. 1.

As evident from FIGS. 8A and 8B, the difference between maximum and minimum temperature of the backlight assembly 14 is 13.4° C. while the temperature difference on the backlight assembly 140 is about 10° C., therefore providing a more uniform temperature distribution. Thus, the LCD 100 according to the present invention makes it easier to control the alignment of liquid crystal molecules within the liquid crystal panel 136 than the conventional LCD, thereby providing improved display quality.

Since the LCD 100 allows easy heat dissipation compared to the conventional LCD, as described above, the surface temperature of the second light source 143c may decrease. The result of temperature measurement shows that the surface temperature of a second light source (not shown) in the conventional LCD is 75° C. while the surface temperature of the second light source 143c in the LCD 100 is about 71° C., that is about 3° C. or 4° C. lower than the surface temperature of the second light source in the conventional LCD.

Referring to FIG. 9, if the surface temperature of the second light source 143c decreases by about 3° C. or 4° C., the characteristics of the second light source 143c may shift from P to P'. That is, a brightness level of the second light source 143c increases from about 38,000 nit to about 43,000 nit. With the increased efficiency of the second light source 143c, the LCD 100 can reduce the power consumption.

Figure 10:
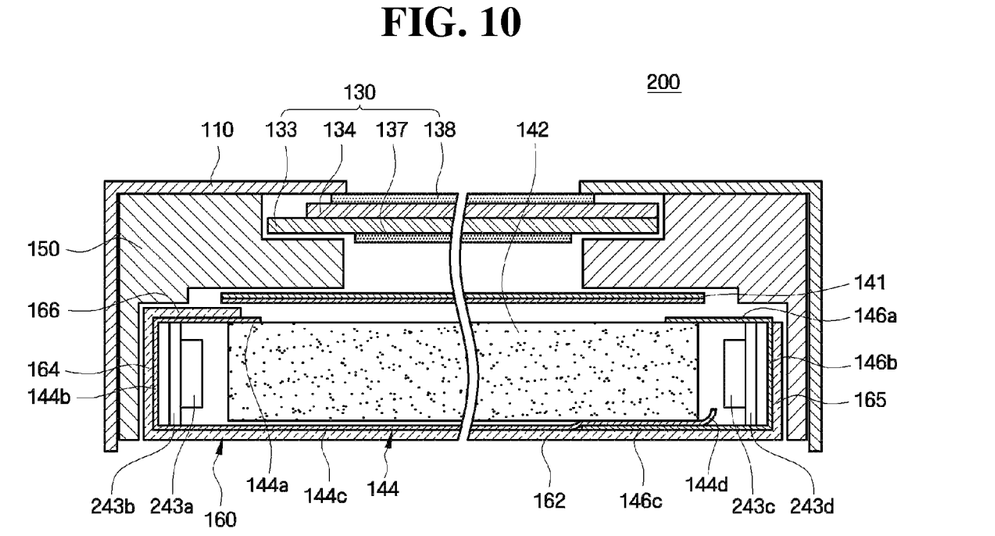
FIG. 10 is a cross-sectional view of an assembled exemplary LCD according to another exemplary embodiment of the present invention.

FIG. 10 is a cross-sectional view of an exemplary assembled LCD 200 according to another exemplary embodiment of the present invention. For brevity, components having substantially the same function as the exemplary embodiment shown in FIG. 3 are identified by the same reference numerals, and detailed descriptions thereof will be omitted. Referring to FIG. 10, first and second light sources 243a and 243c may be point light sources such as light-emitting diodes ("LEDs"). It is assumed hereinafter that the first and second light sources 243a and 243c are LEDs. A series of LEDs 243a and 243c are mounted on a PCB 243b and a PCB 243d, respectively, so that they respectively face two light incident surfaces of an LGP 142.

The PCBs 243b and 243d may almost be in contact with the light incident surfaces of the LGP 142 so as to facilitate dissipation of heat generated in the LEDs 243a and 243c.

Although FIG. 10 shows that the first and second light sources 243a and 243c are LEDs emitting light to sides of the LGP 142, they may instead be LEDs emitting light to a bottom of the LGP 142. In this case, the PCBs 243b and 243d may be attached onto a bottom surface 162 of a lower receiving container 160.

Figure 11:
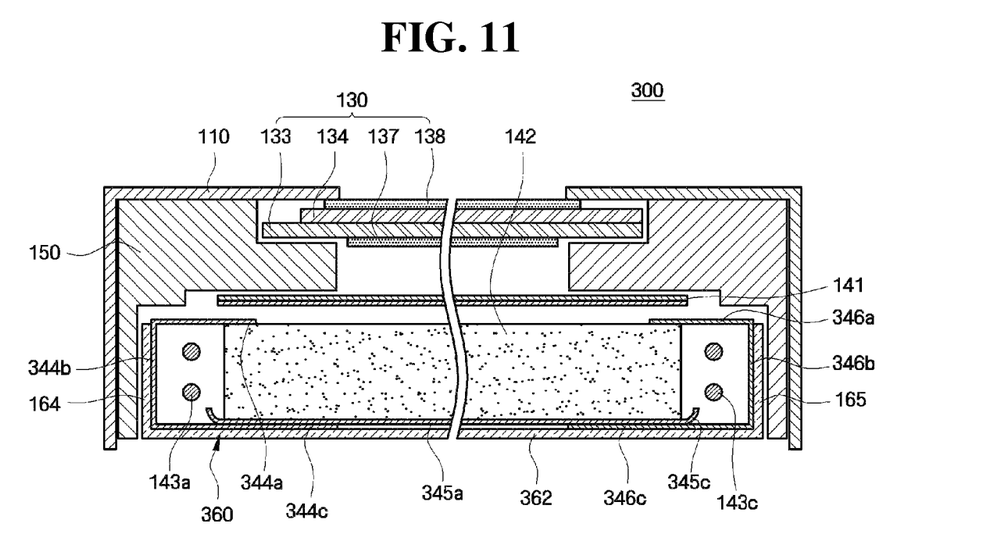
FIG. 11 is a cross-sectional view of an assembled exemplary LCD according to still another exemplary embodiment of the present invention.

FIG. 11 is a cross-sectional view of an exemplary assembled LCD 300 according to still another exemplary embodiment of the present invention. The LCD 300 according to the current embodiment includes an LGP 142 guiding light, first and second light sources 143a and 143c emitting light, a first reflection sheet 344a, 344b, 344c having a portion 344c thereof disposed below the LGP 142 and the remaining portion 344a, 344b enclosing the first light source 143a, a second reflection sheet 346a, 346b, 346c having a portion 346c thereof disposed below the LGP 142 and the remaining portion 346a, 346b enclosing the second light source 143c, a third reflection sheet 345a, 345c disposed between the LGP 142 and a portion 344c of the first reflection sheet 344a, 344b, 344c and between the LGP 142 and a portion 346c of the second reflection sheet 346a, 346b, 346c, a lower receiving container 360 having a bottom surface 362, the first side wall 164 and the second side wall 165, and a liquid crystal panel 136 receiving light and displaying an image.

The first reflection sheet 344a, 344b, 344c includes a first portion 344c that is disposed below the LGP 142 and the first light source 143a and a second portion 344a and 344b that extends upward from one end (a first end) of the first portion 344c and is folded to enclose the first light source 143a. The second reflection sheet 346a, 346b, 346c includes a third portion 346c that is disposed below the LGP 142 and the second light source 143c and a fourth portion 346a and 346b that extends upward from one end (a first end) of the third portion 346c and is folded to enclose the second light source 143c.

The second portion 344a and 344b of the first reflection sheet 344a, 344b, 344c and the fourth portion 346a and 346b of the second reflection sheet 346a, 346b, 346c are folded into an upside-down 'L' shape. The folded portions of the second portion 344a and 344b and the fourth portion 346a and 346b may be provided with folding creases.

The third reflection sheet 345a, 345c may be disposed between the LGP 142 and the first portion 344c of the first reflection sheet 344a, 344b, 344c and between the LGP 142 and the third portion 346c of the second reflection sheet 346. The third reflection sheet 345a, 345c further has slope portions 345c that are raised from either or both ends thereof toward the LGP 142.

More specifically, the third reflection sheet 345a, 345c has a planar portion 345a and the slope portions 345c extending from two ends of the planar portion 345a. The folded portions of the slope portions 345c may also have folding creases.

At least one of the first through third reflection sheets 344a, 344b, 344c, 346a, 346b, 346c, and 345a, 345c may be formed of Ag to a thickness of about 220 μm or greater.

The first through third reflection sheets 344a, 344b, 344c, 346a, 346b, 346c, and 345a, 345b, 345c may be attached to the lower receiving container 360 using an adhesive member so that the other end (second end) of the first portion 344c of the first reflection sheet 344a, 344b, 344c and the other end (second end) of the third portion 346c of the second reflection sheet 346a, 346c, 346c are partially overlapped by the third reflection sheet 345a, 345c.

The lower receiving container 360 has a bottom surface 362 disposed below the first portion 344c of the first reflection sheet 344a, 344b, 344c and the third portion 346c of the second reflection sheet 346a, 346b, 346c, and the third reflection sheet 345a, 345c. Further, the lower receiving container 360 may include the first side wall 164 extended from one end of the bottom surface 362 and the second side wall 165 extended from the other side of the bottom surface 362. That is, the lower receiving container 360 may not have a top surface unlike the LCD 100 or 200 of FIG. 1 or 10. Therefore, the lower receiving container 360 does not enclose the first light source 143a or the second light source 143c.

Thus, the LCD 300 does not include thermal obstacles such as a top surface between the second reflection sheet 346a, 346b, 346c adjacent to the second light source 143c and the middle frame 150 nor between the first reflection sheet 344a, 344b, 344c adjacent to the first light source 143a and the middle frame 150. This configuration allows easy dissipation of the heat generated by the second light source 143c as well as by the first light source 143a. By dissipating heat in this way, a difference between temperatures at the center and at the periphery of a backlight assembly (not shown) can be significantly reduced and a display quality of the LCD 300 can be improved. As previously described with respect to FIG. 9, by reducing a temperature of the second light source 143c from 75° C. to about 71° C., a brightness level is increased. Likewise, a brightness level of the first light source 143a will also be increased when the temperature of the first light source 143a is reduced from 75° C. to about 71° C. With the increased efficiency of the first and second light sources 143a, 143c, the LCD 300 can reduce the power consumption.

Although not shown in FIG. 11, the lower receiving container 360 may further include hooks (not shown) that extend from two opposing ends of the bottom surface 362 and are further folded as in the LCD 100 of FIG. 1.

In the embodiment shown in FIG. 11, the first and second light sources 143a and 143c may be point light sources like in the LCD 200.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
a light guide panel guiding light;
first and second light sources that are disposed at either side of the light guide panel and emit the light;
a lower receiving container having a bottom surface which is disposed below the light guide panel and the first and second light sources, an enclosing portion that extends from a first end of the bottom surface and that is folded to enclose the first light source and an opening portion that extends from a second end of the bottom surface and that is opened toward an upper direction;
a first reflection sheet disposed below the light guide panel and the second light source directly attached to and covering the opening portion of the lower receiving container, the first reflection sheet being disposed above the second light source and folded to enclose the second light source; and
a second reflection sheet disposed below the light guide panel and the first light source directly attached to and covering the enclosing portion of the lower receiving container, the second reflection sheet being disposed above the first light source and folded to enclose the first light source.

2. The liquid crystal display of claim 1, wherein the lower receiving container includes a first side wall extended from the first end of the bottom surface, a second side wall extended from the second end of the bottom surface, and a top surface extended from the first side wall in parallel with the bottom surface.

3. The liquid crystal display of claim 1, wherein the enclosing portion of the lower receiving container, where the first light source is disposed, is folded in a Korean alphabet "ㄷ" shape, and the opening portion where the second light source is disposed is folded in an "L" shape.

4. The liquid crystal display of claim 1, wherein the second reflection sheet has a first portion, disposed below the light guide panel and the first light source, and a second portion that extends from a first end of the first portion and that is folded to enclose the first light source,
wherein the first reflection sheet has a third portion disposed below the light guide panel and the second light source and a fourth portion that extends from a first end of the third portion and that is folded to enclose the second light source.

5. The liquid crystal display of claim 4, wherein a second end of the first portion of the second reflection sheet partially overlaps with a second end of the third portion of the first reflection sheet and the first portion has a slope portion that is raised from the second end of the first portion toward the light guide panel.

6. The liquid crystal display of claim 4, wherein at least one of the first and second reflection sheets is formed of silver (Ag).

7. The liquid crystal display of claim 4, wherein at least one of the first and second reflection sheets has a thickness of about 220 μm or greater.

8. The liquid crystal display of claim 4, wherein the fourth portion of the first reflection sheet is folded in an "L" shape.

9. The liquid crystal display of claim 4, further comprising a middle frame enclosing the second and fourth portions.

10. The liquid crystal display of claim 9, wherein the lower receiving container further includes hooks that extend from two opposing ends of the bottom surface and the middle frame is inserted into a space formed by the hooks.

11. The liquid crystal display of claim 1, wherein the first and second light sources are line light sources or point light sources.

12. A liquid crystal display comprising:
a light guide panel guiding light;
first and second light sources that are disposed at either side of the light guide panel and emit the light;
a lower receiving container having a bottom surface which is disposed below the light guide panel and the first and second light sources, a first opening portion that extends from a first end of the bottom surface and that is opened toward a first upper direction, and a second opening portion that extends from a second end of the bottom surface and that is opened toward a second upper direction;
a first reflection sheet disposed below the light guide panel and the first light source directly attached to and covering the first opening portion of the lower receiving container, the first reflection sheet being disposed above the first light source and folded to enclose the first light source; and
a second reflection sheet disposed below the light guide panel and the first light source directly attached to and covering the second opening portion of the lower receiving container the second reflection sheet being disposed above the second light source and folded to enclose the second light source.

13. The liquid crystal display of claim 12, wherein the lower receiving container includes a first side wall extended from the first end of the bottom surface and a second side wall extended from the second end of the bottom surface.

14. The liquid crystal display of claim 12, wherein the first opening portion where the first light source is disposed and the second opening portion where the second light source is disposed are folded in an "L" shape, respectively.

15. The liquid crystal display of claim 12, wherein the first reflection sheet has a first portion disposed below the light guide panel and the first light source and a second portion that extends from a first end of the first portion and that is folded to enclose the first light source, and the second reflection sheet has a third portion disposed below the light guide panel and the second light source and a fourth portion that extends from a first end of the third portion and that is folded to enclose the second light source, the liquid crystal display further comprising a third reflection sheet disposed between the light guide panel and the first portion of the first reflection sheet and between the light guide panel and the third portion of the second reflection sheet.

16. The liquid crystal display of claim 15, wherein at least one of the first end and a second end of the third reflection sheet has a slope portion that is folded toward the light guide panel.

17. A method of fabricating a liquid crystal display, the method comprising:
preparing a lower receiving container having a bottom surface and a folded portion that extends from a first end of the bottom surface, and the lower receiving container having an opening portion that extends from a second end of the bottom surface and that is opened toward an upper direction;
mounting a first reflection sheet on the bottom surface and the second end of the bottom surface;
mounting a second reflection sheet on the folded portion that extends from the first end of the bottom surface of the lower receiving container;
installing a first light source into the folded portion of the lower receiving container so as to enclose the first light source, mounting a light guide panel on the bottom surface, and installing a second light source above the second end of the bottom surface; and
folding the first reflection sheet so as to enclose the second light source,
wherein end portions of each the first and second reflective sheets overlap each other.

18. The method of claim 17, wherein mounting the first reflection sheet, installing the first light source, mounting the light guide panel and installing the second light source are performed in the lower receiving container by a sequential, bottom-up assembling operation.

19. The method of claim 17, wherein mounting the first reflection sheet comprises attaching the first reflection sheet to the lower receiving container by applying an adhesive member to a portion of the first reflection sheet to be attached to the lower receiving container.

* * * * *